United States Patent [19]

Abbondanti

[11] Patent Number: 4,870,338
[45] Date of Patent: Sep. 26, 1989

[54] LOAD COMMUTATED INVERTER (LCI) INDUCTION MOTOR DRIVE

[75] Inventor: Alberto Abbondanti, Pittsburgh, Pa.

[73] Assignee: Westinghouse Electric Corp., Pittsburgh, Pa.

[21] Appl. No.: 249,524

[22] Filed: Sep. 26, 1988

[51] Int. Cl.[4] .................................. H02P 5/40
[52] U.S. Cl. ........................ 318/809; 318/803
[58] Field of Search ............ 318/803, 807, 808, 805, 318/809, 811

[56] References Cited

U.S. PATENT DOCUMENTS 4,330,741  5/1982  Nagase et al. ................. 318/808
4,338,559  7/1982  Blaschke et al. .............. 318/803

OTHER PUBLICATIONS

Ito et al, "Analysis Offield Orientation Control of Current Inverter Drive Induction Motor Systems", IEEE Transaction on Industry Applications, vol. IA-19, No. 2, Mar./Apr. 1983, pp. 206-210.

Primary Examiner—David Smith, Jr.
Attorney, Agent, or Firm—C. M. Lorin

[57] ABSTRACT

A current source inverter for a load commutated induction motor drive is controlled in relation to the direct and quadrature components of the current vector as assigned in response to stator voltage, speed reference and actual speed. Control is on the inverter and the converter in relation to both components.

3 Claims, 6 Drawing Sheets

LOAD COMMUTATED INVERTER (LCI) INDUCTION MOTOR DRIVE

FIELD OF THE INVENTION

The invention relates to control of Load Commutated Inverter (LCI) induction motor drives.

BACKGROUND OF THE INVENTION

Load Commutated Inverter (LCI) Synchronous Motor Drives using a thyristor inverter bridge do not need forced commutation means, because automatic thyristor turn-off is achieved with a synchronous motor as the load, if it has a leading phase angle with respect to the load voltage. For a given load, increasing sufficiently the field will produce such leading power factor. See, for instance:

"The Synchronous Machine as a Self-Controlled Converter-Fed Motor" by Dieter Kollensperger in Siemens Review XXXV (1968) No. 5, pp. 195-201;

U.S. Pat. No. 4,713,743 of Dec. 15, 1987 (Alberto Abbondanti).

With an induction motor, however, this possibility no longer exists. The load power factor is lagging for all machine excitation levels. Therefore, specific circuitry must be used to allow a leading phase angle to take place, thereby providing natural commutation of the inverter bridge. To this effect, a general solution is to add a large capacitor bank in parallel with the motor, so that the lagging load power factor be overcompensated, the net result being that leading VAR's are supplied to the composite load. Accordingly, the resultant leading power factor angle will insure natural commutation of the inverter poles. In such case, the motor drive is referred to as a Load Commutated Inverter Induction Machine (LCI/IM) drive. Thus, when the power factor of the induction motor has been overcompensated to produce a leading load power factor to a current source, in principle the induction motor behaves much like a synchronous motor as far as current source inverter (CSI) is concerned, for a significant speed range. With LCI/IM drives, however, control difficulties arise if merely conventional current source inverter control schemes are used. In particular, stability problems are encountered. On the other hand, it is advantageous to be able to rely upon known CSI control methods such as used on forced-commutation motor drives, in order to regulate the DC-Link current magnitude and achieve a desired motor voltage in a LCI/IM drive.

SUMMARY OF THE INVENTION

According to the present invention, natural commutation and stable control in an LCI/IM drive are achieved through the use of means for establishing for the current source inverter a firing angle in relation to the outputted power factor.

Specifically, the firing angle established according to the invention is in relation to the direct and quadrature components of the current vector as assigned in response to the stator voltage of the motor, its speed and the reference speed used. Concurrently, the magnitude of such vector is used in combination with a current feedback of the power line supply in order to control the DC-Link current.

BRIEF DESCRIPTION OF THE DRAWINGS

FIG. 3A is a vectorial representation of the load phasor involved in the circuit of FIG. 3;

DETAILED DESCRIPTION OF THE INVENTION

The present invention relates to control of Load Commutated Inverter Induction Motor (LCI/IM) drives. It will be shown hereinafter how the power factor of an induction motor may be overcompensated in order to produce a leading power factor to a current source inverter (CSI). When this is achieved, the induction motor behaves much like a synchronous motor in a Load Commutated Inverter (LCI) drive that is, natural commutation of the thyristors of the inverter bridge by the load is obtained over a significant range of motor speed. The purpose of the present invention is to be able to use a conventional current source inverter (CSI) control system without the difficulties generally encountered in the prior art. It is also advantageous to be able to use conventional control circuitry as used with synchronous motors at the expense of a minimum of changes to implement operation with an induction machine.

Figure 1A:
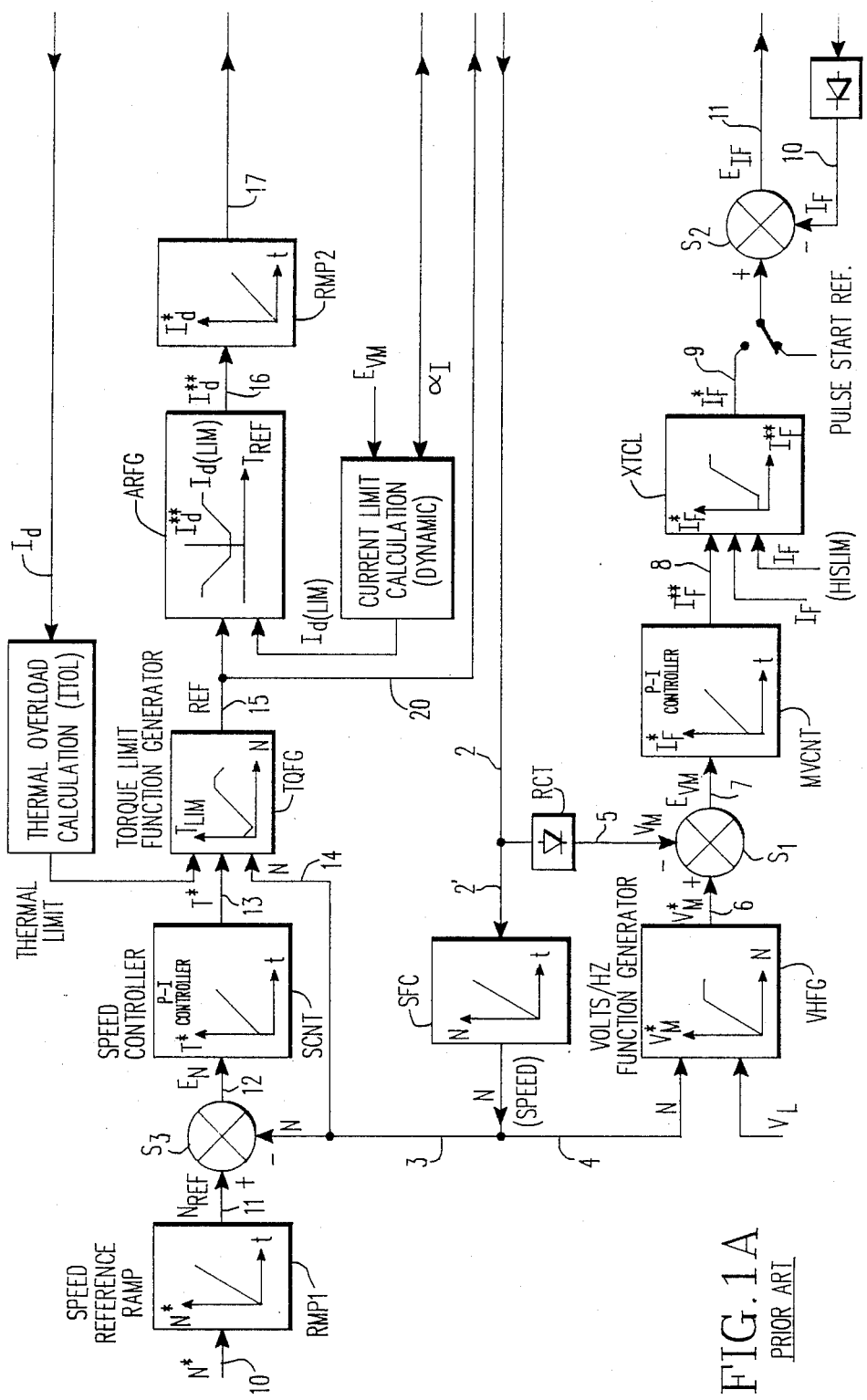
FIG. 1 is a block diagram showing a typical control circuit for a LCI synchronous motor drive.
Figure 1B:
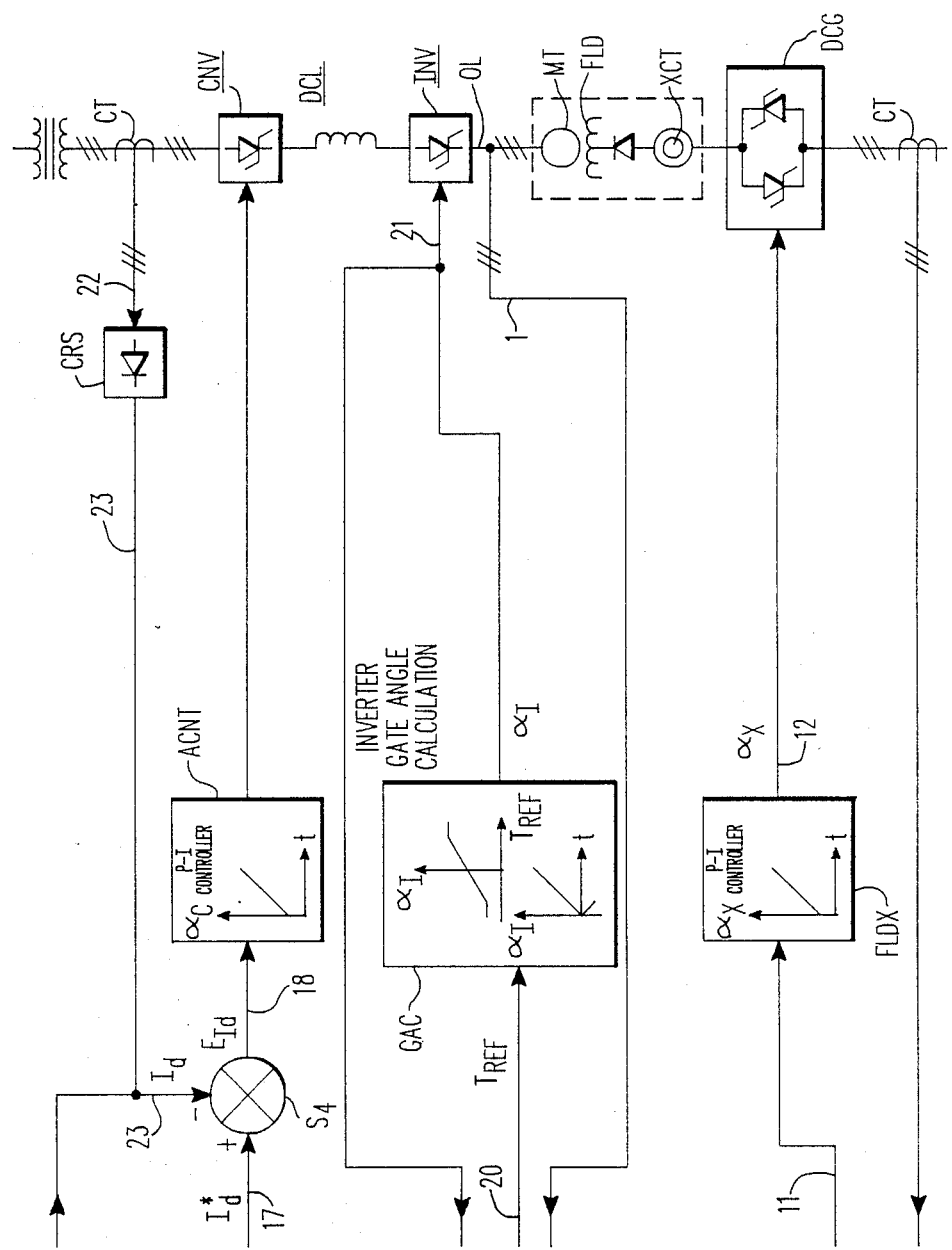

Referring to FIG. 1, a CSI control system of the prior art is shown as applicable to a synchronous motor MT. The AC power supply derived from a transformer PS is applied to a converter CNV which connects with an inverter INV through a DC-Link DCL, as generally known. The synchronous motor is excited by a field winding FLD supplied with current from an exciter (XCT) in the form of a wound rotor AC motor supplied with DC power from a direct current generator DCG.

From the output lines OL of the inverter to the synchronous motor MT is derived a voltage $V_M$ (on lines 1 and 2) representing the voltage of lines OL reflected by the motor. $V_M$ is passed, by lines 2 and 2', through a circuit SFC providing, through zero-crossing detection, speed feedback calculation and leading to a signal on lines 3 and 4 representing actual speed N of the motor. A desired speed N* applied on line 10 is adjusted by a ramp function RMP1 so as to provide a reference speed signal NREF on line 11. The latter is compared at S3 with the actual speed of line 3, thus providing a speed error EN on line 12. This error is converted by a P-I controller SCNT into a torque command signal T* on line 13 and applied to a torque limit function generator TQFG also responsive to the speed signal of line 3 received through line 14. The result is a torque reference signal on line 15 which is converted into an armature current command signal on line 16 by an armature current reference function generator ARFG. The signal of line 16 is passed through a ramp function RMP2. The result is a reference signal for the armature current. This signal is compared at S4 with a current feedback signal derived on line 23 from the AC supply of the converter CNV, to provide an error Eid on line 18. A P-I controller ACNT converts the error Eid into a firing angle signal $\alpha_c$ for the converter as applied on line 19. The reference signal of line 15 is passed via line 20 to an inverter gate angle calculation circuit GAC generating, on line 21, a control signal for the inverter amounting to a firing angle $-_i$.

The speed feedback signal of line 4 is applied a function generator VHFG effecting a volt-per-Hertz ratio transformation in relation to an incoming line voltage representative signal ($V_L$). The result is a voltage demand signal, on line 6, which is compared with a voltage feedback signal derived on line 5 after rectification at RCT of the signal of line 2. Te resulting error $E_{VM}$, on line 7, is used to control the excitation of the synchronous motor and to provide overexcitation for LCI effect on the inverter. This is obtained, above the normal field excitation IF, by circuit XTCL also introducing an exciter current limit. Accordingly, the signal of line 7 is first passed into a P-I controller MVCNT before providing, on line 8, the input signal If** for circuit XTCL. The outputted signal, on line 9, is compared at S2 with a field current feedback signal derived on line 10. The resulting signal $E_{IF}$, on line 11, is passed through a P-I controller FLDX, so as to generate on line 12 the required firing angle $\alpha_x$ for rectifier DCG belonging to the field power supply. The preceding is a description of a conventional current source inverter control (CSI) for a LCI synchronous motor drive.

Figure 2:
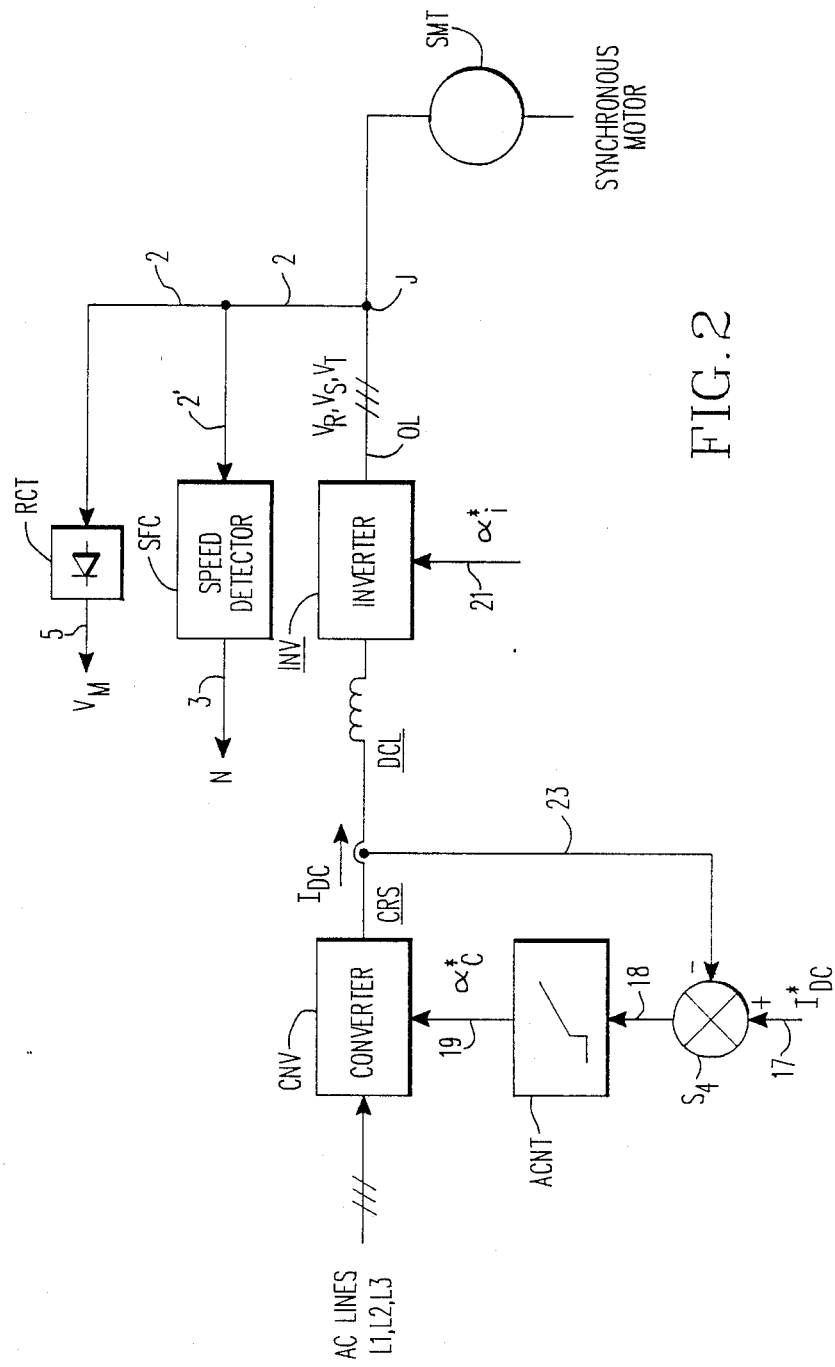
FIG. 2 is more schematic representation of the circuit of FIG. 1.

The circuit of FIG. 1 has been schematically reproduced on FIG. 2 for the sake of clarity. There, appears a DC-Link DCL connected between converter CNV and inverter INV. The speed feedback signal of line 3 is shown derived from a speed detector SFC responding on line 2 to the voltage sensed from lines OL. A DC-link current feedback signal is derived on line 23 and applied at S4 for comparison with the desired DC link current IDC* of line 17. The firing angle $\alpha_c$ of the converter is controlled by line 19, like in FIG. 1, and the firing angle control signal $\alpha_i*$ for the inverter is applied on line 21.

Figure 3:
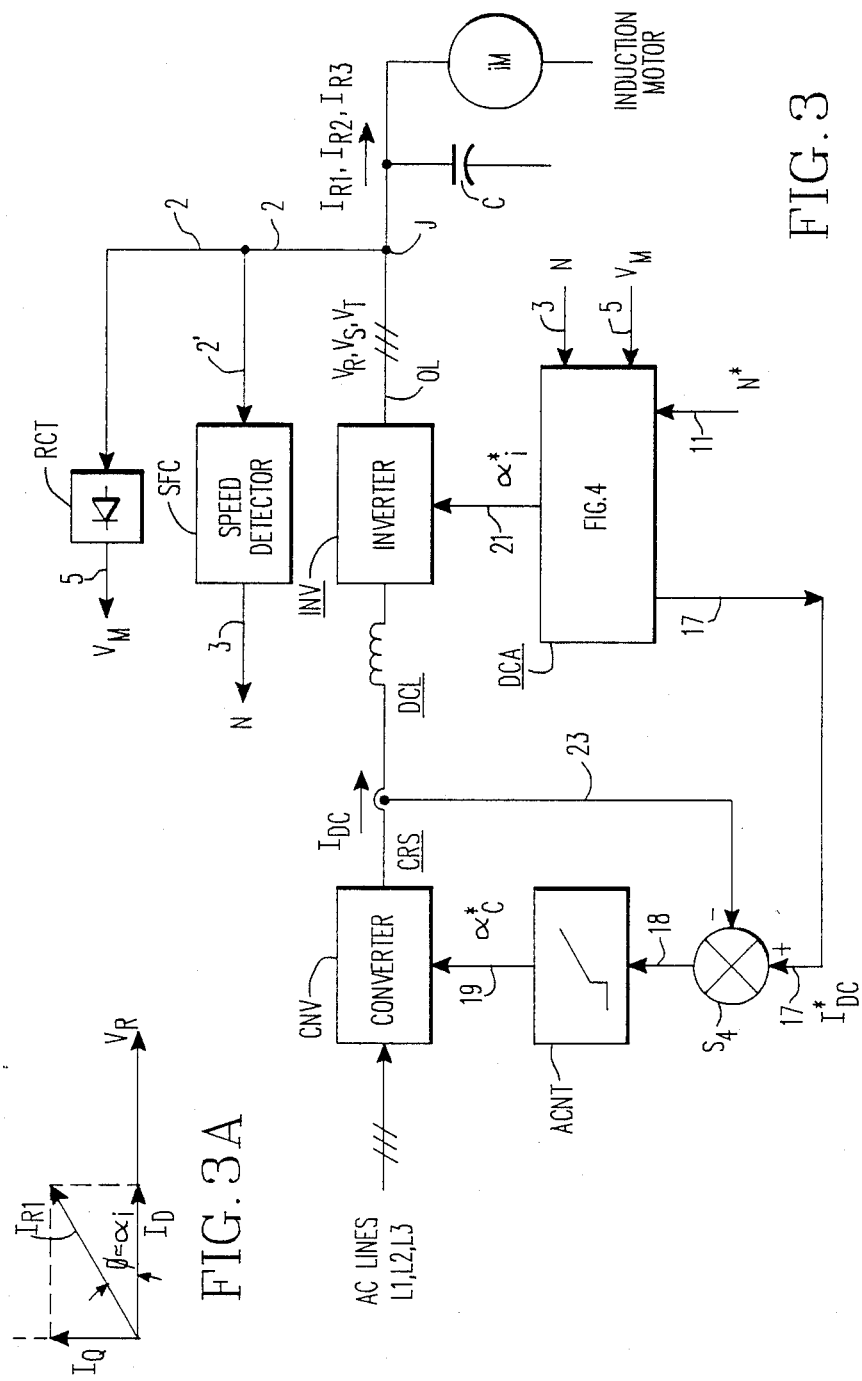
FIG. 3 shows the circuit of FIG. 2 as modified by the adjunction, according to the present invention, of an inverter control angle generator specially designed in order to fit the operation of an LCI/IM drive.

By comparison with FIG. 2, as shown in FIG. 3, the present invention provides, with a circuit DCA (shown specifically in FIG. 4), for the generation of the signals $I_{DC}*$ and $\alpha_i*$ of lines 17 and 21 in response to inputted signals, namely, the feedback speed N of line 3 and the reference speed N* of line 11.

This is based on the fact that in FIG. 1 a converter gating angle $\alpha_c*$ is generated (in fact by a microprocessor-based controller), whereas the actual gating angle $\alpha_c$ is a replica of $\alpha_c*$. Similarly, an inverter gating angle reference $\alpha_i*$ is generated. The $\alpha_c$ is the output of a current regulating loop that enforces a DC-Link current IDC which matches the current reference $I_{DC}*$. As in FIG. 1, the voltages of line 2, are rectified at RCT and a voltage signal $V_M$ is derived on line 5. In response to lines 2 and 2', the zero-crossings of the voltages of lines OL are detected and converted within speed detector SFC to provide on line 3 a signal representing the actual speed N of the motor. Therefore, the basic control quantities of such a LCI drive are the reference variables $I_{DC}*$ for the converter on line 17, $\alpha_i*$ on line 21 for inverter control, the voltage $V_M$ on line 5, the reference speed signal received on line 11 and the speed feedback signal N of line 3. Since the prior art implements motor drive control for a synchronous motor drive with a control algorithm effective upon the converter and the inverter according to the circuit of FIG. 2, in the case of an induction motor drive, control of the operation will be done, according to the present invention, by merely using the same hardware in combination with another control algorithm. In order to explain what the nature and internal functions of this other control algorithm actually are, reference is made to FIG. 4 which illustrates in block diagram how circuit DCA, according to the present invention, is implemented.

Control variables $I_{DC}*$ and $\alpha_i*$ have to be generated while using speed feedback variable N and reference speed signal N*. The purpose is to control speed while achieving system stability and motor excitation regulation. In this regard, the phase relationship between motor voltages $V_R$, $V_S$ and $V_T$ and the load current fundamental components IR1, IS1, IT varies with speed. This is illustrated vectorially by FIG. 3A where, for the phase R voltage $V_R$. The direct component ID of the phase current $I_{R1}$ is a vector aligned with $V_R$, the $I_{R1}$ vector being at an angle $\phi \approx \alpha_i$. The quadrature component of the current is IQ. This is a generally known load phasor diagram which is applicable to a LCI/IM drive. The assumption is that the speed is roughly at midrange of the operative span. Thus, the load current leads the load voltage, as it should in order to allow natural commutation. The leading power factor angle $\phi$ is essentially equal to the inverter gating angle $\alpha_i$, the secondary effects of commutation being neglected. From FIG. 3A, considering the two components ID in phase with the load voltage $V_R$ and $I_Q$ in leading quadrature therewith, the following equations obtain:

$$IR1 = \sqrt{I_D^2 + I_Q^2} \quad (1)$$

$$\infty_i = \arctan(I_Q/I_D) \quad (2)$$

It is known from motor theory that vector component $I_D$ primarily generates the torque of the motor, whereas vector component $I_Q$ primarily generates the flux. Therefore, component $I_D$ should be controlled when regulating the speed, and component $I_Q$ should be controlled when regulating the motor terminal voltage amplitude. Moreover, motor voltage amplitude $V_M$ is proportional to both the flux and speed, whereas the motor flux is generated by a lagging quadrature component of the stator current. Therefore, a transient decrease in $I_Q$ must be produced in order to obtain a transient increase in $V_M$. There is also the fact that the induction motor and the power factor compensating capacitor bank C, together form an inherently unstable combination, as will be explained hereinafter. This unstability manifests itself by a tendency of the motor to be overexcited in runaway fashion, the motor voltage increasing to a high level, the only limit to it coming from saturation. In order to counteract this unstability, it is now proposed to regulate the quadrature component $I_Q$ in response to the motor voltage deviations from a set amplitude, the latter being chosen in relation to speed and the desired flux. Such regulation is further accomplished while choosing a proper polarity, gain and frequency compensation, so as to maintain good stability.

It is also observed that the load current $I_{R1}$ is directly proportional to the magnitude of the DC-Link current $I_{DC}$.

Figure 4:
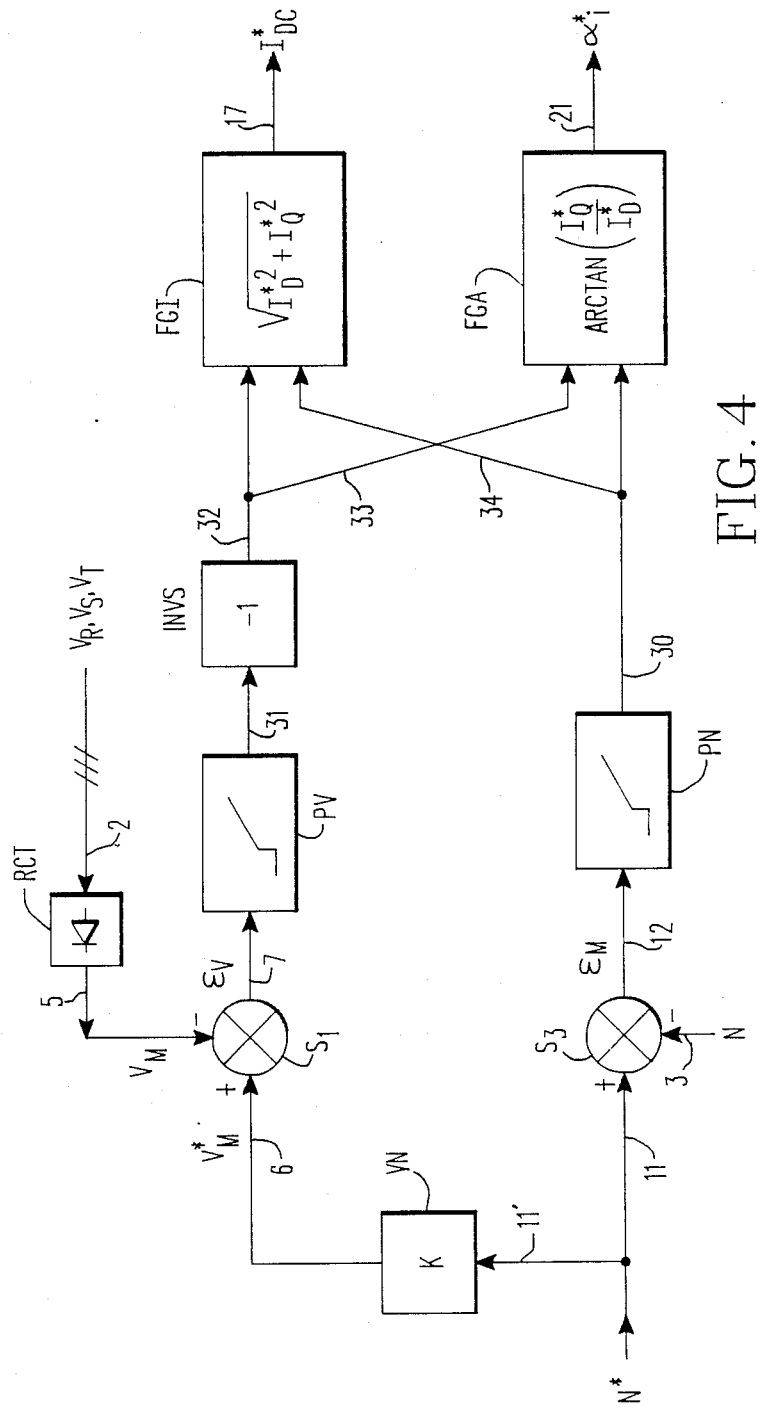
FIG. 4 is a block diagram illustrating the structures and functions of the inverter control angle generator of FIG. 3.

In the light of the preceding considerations, the control scheme according to the present invention will be understood by reference to FIG. 4.

A speed reference signal N* representative of the desired speed (on line 11) is compared, at S3, with the actual speed (line 3) as sensed by a speed sensor and feedback. The speed error en outputed on line 12 is processed by a P-I controller PN providing on its output line 30 a reference signal $I_D^*$ representative of the desired amplitude for the load in-phase current component $I_D$.

The motor voltage being made proportional to speed for constant motor excitation over the speed range, the reference speed signal of line 11 is passed through a scaling block VN so as to provide a voltage reference $V_M^*$ which is a linear counterpart of the speed reference signal N*. At the same time the load voltages $V_{R1}$, $V_S$ and $V_T$ of line 2 are sensed and rectified at RCT so as to generate on line 5 a signal $V_M$ representative of the actual motor voltage amplitude. The reference and actual voltage signals of lines 6 and 5 are compared at S1 to provide a voltage error ev on line 31. The signal of line 31 is processed by a P-I controller PV and the output on line 31, after inversion at INVS, represents on line 32 a reference $I_Q^*$ for the desired amplitude of the load quadrature current $I_Q$.

The two reference signals of lines 30 and 32 are used according to equations (1) and (2) to generate the control variables $I_{DC}^*$ and $\alpha_i^*$. To this effect function generator FGI responds to line 32 and to lines 30 and 34. and performs the calculation $$\sqrt{I_D^{*2} + I_Q^{*2}},$$

with the result $I_{DC}^*$ being on line 17, whereas function generator FGA responds to line 30 and to lines 32 and 33, and calculates arctan $(I_Q^*/I_D^*)$, the result being of line 21.

Figure 5:
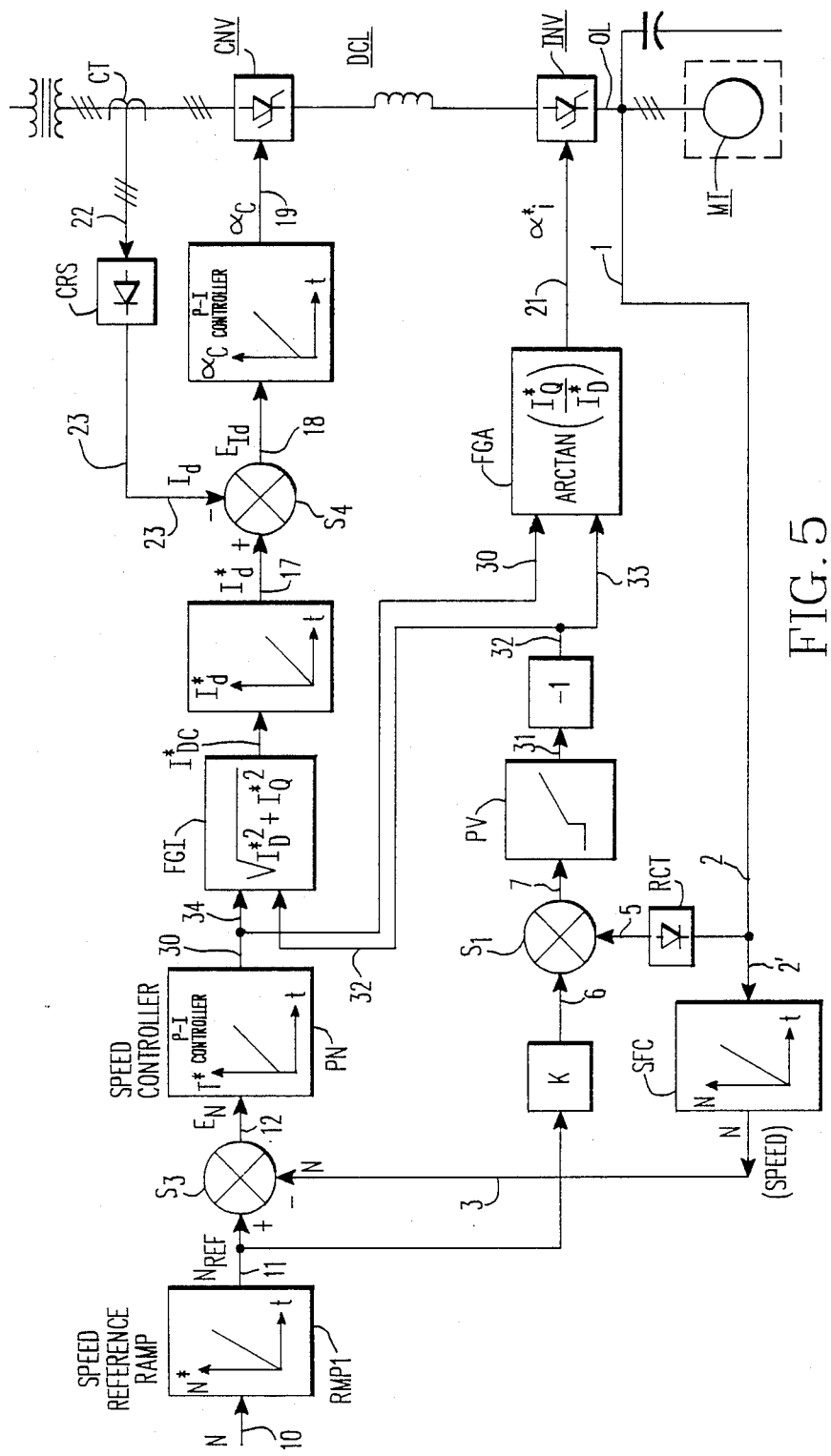
FIG. 5 shows the circuit of FIG. 1 as amended in order to embody the features shown in FIG. 4.

FIG. 5 is FIG. 1 as amended to embody the circuitry of FIG. 4 when an induction machine MT, with a parallel capacitor bank C, is used rather than a synchronous motor.

In operation the circuit of FIG. 4 will generate a quadrature component $I_Q^*$ to counteract any instability due to the tendency of the motor to be overexcited in a runaway fashion, as the motor voltage is building up to high levels limited only by saturation. In response to motor voltage deviations detected on line 7, the quadrature component $I_Q^*$ is regulated automatically. As shown in FIG. 4, this regulation is accomplished with the proper polarity (line 7), gain (PV) and frequency (VN and line 6) compensation to achieve acceptable stability.

In addition, as shown by the loop from line 11 through scaling circuit VN and line 6, independent regulation of the quadrature component of the load currents is effected in reference to the load voltage (line 2). The same can be said of the in-phase component (lines 11, 3, 12, PN and line 30) in response to motor speed.

More generally, an LCI/IM drive is controlled, according to the present invention by separate and independent regulation of the in-phase and quadrature components of the load current in reference to the load voltage.

I claim:

1. In a load commutated inverter (LCI) induction motor (IM) drive including: a capacitor blank in parallel to the motor for generating a leading power factor, an AC power supply, a converter for converting said power supply into DC current, an inverter for supplying AC current to the motor, a DC-link between said converter and said inverter; the combination of:
   first means responsive to a signal representative of the voltages outputted by said inverter and to a reference speed signal for generating a first signal representative of a quadrature component of the phase currents of said inverter;
   second means responsive to a signal representative of motor speed and to said reference speed signal for generating a second signal representative of a direct component of the phase currents of said inverter;
   third means responsive to said first and second signals for generating a first control signal representative of the desired current in said DC-link;
   fourth means responsive to said first and second signals for generating a second control signal representative of the power factor angle of the motor drive;
   said converter being controlled by said first control signal in relation to the DC-link current flowing therethrough, and the firing angle of said inverter being controlled by said second control signal.

2. The LCI motor drive of claim 1, with said first signal being $I_Q^*$ and said second signal being $I_D^*$, said third means being a first function generator calculating $$\sqrt{I_D^{*2} + I_Q^{*2}}$$

as said first control signal; and with said fourth means being a second function generator calculating arctan $(I_Q^*/I_D^*) = \alpha_i$, with $\alpha_i$ as said second control signal.

3. The LCI motor drive of claim 2 further including:
   means responsive to the difference between a motor speed feedback signal and a speed reference signal for generating a speed error signal, said direct current component being obtained in relation to said speed error signal;
   means responsive to the output of said inverter for deriving a signal representative of the motor voltage;
   means responsive to said motor voltage representative signal and to a voltage demand signal derived in relation to said reference speed signal for deriving a voltage error signal, said quadrature current component being obtained in relation to said voltage error.

* * * * *